United States Patent [19]
Plasse et al.

[11] Patent Number: 5,127,144
[45] Date of Patent: * Jul. 7, 1992

[54] LOCK WIRE SECURING TOOL

[75] Inventors: Michel L. Plasse, Hackensack; Thomas E. Carr, East Brunswick; Robert H. Koehler, Secaucus; William E. Koehler, North Bergen, all of N.J.

[73] Assignee: Bergen Cable Technologies, Lodi, N.J.

[*] Notice: The portion of the term of this patent subsequent to Oct. 1, 2008 has been disclaimed.

[21] Appl. No.: 707,601

[22] Filed: May 30, 1991

Related U.S. Application Data

[63] Continuation of Ser. No. 422,574, Oct. 17, 1989, Pat. No. 5,052,094.

[51] Int. Cl.$^5$ ............................................. B23P 19/00
[52] U.S. Cl. ............................................. 29/252; 29/282
[58] Field of Search ............ 29/252, 788, 282, 255, 29/280, 452; 254/29 A

[56] References Cited
U.S. PATENT DOCUMENTS

| | | |
|---|---|---|
| 847,776 | 3/1907 | Huising . |
| 1,147,845 | 7/1915 | Brooks . |
| 1,182,602 | 5/1916 | Tuohy . |
| 1,277,305 | 8/1918 | Gerrard . |
| 1,408,846 | 3/1922 | Turner . |
| 1,555,819 | 10/1925 | Baruch . |
| 1,807,479 | 10/1929 | James . |
| 2,267,532 | 12/1941 | Moberg . |
| 2,764,861 | 6/1953 | Wenk, Jr. . |
| 3,353,227 | 4/1965 | Kabel . |
| 3,570,554 | 3/1971 | Kabel . |
| 3,658,296 | 4/1972 | Yegge . |
| 3,911,970 | 10/1975 | Lundberg . |
| 4,170,820 | 10/1979 | Klose . |
| 4,747,433 | 5/1988 | Dixon . |
| 5,052,094 | 10/1991 | Plasse et al. ............... 29/252 |

*Primary Examiner*—Robert C. Watson
*Attorney, Agent, or Firm*—Bacon & Thomas

[57] ABSTRACT

A device and method for connecting together elements such as fasteners using a tension element such as wire or cable extending through the elements includes an installation tool having an elongated handle portion having at its distal end a retaining socket for a ferrule to be permanently crimped to a tensioning element that has been threaded through a series of elements or fasteners to be interconnected by the wire or cable. A tension element movable longitudinally along the tool axis grips the tension wire or cable and withdraws it generally along the axis of the tool handle after the tension element has been threaded through the objects to be connected together until a predetermined tension is applied to the wire or cable. Thereafter, the ferrule is permanently deformed by a punch element so that it is permanently secured to the tension wire or cable, following which the wire or cable outboard of the ferrule is cut to leave the tensioned wire in place with the elements fastened together. An hydraulic system is disclosed for applying the predetermined tension to the tension wire and for actuating a fluid operated piston to drive the punch for crimping the ferrule permanently to the tension element used to lock the objects together. The system has particular application for applying lock wires to threaded fasteners. A magazine holder for the ferrule elements is also described.

1 Claim, 5 Drawing Sheets

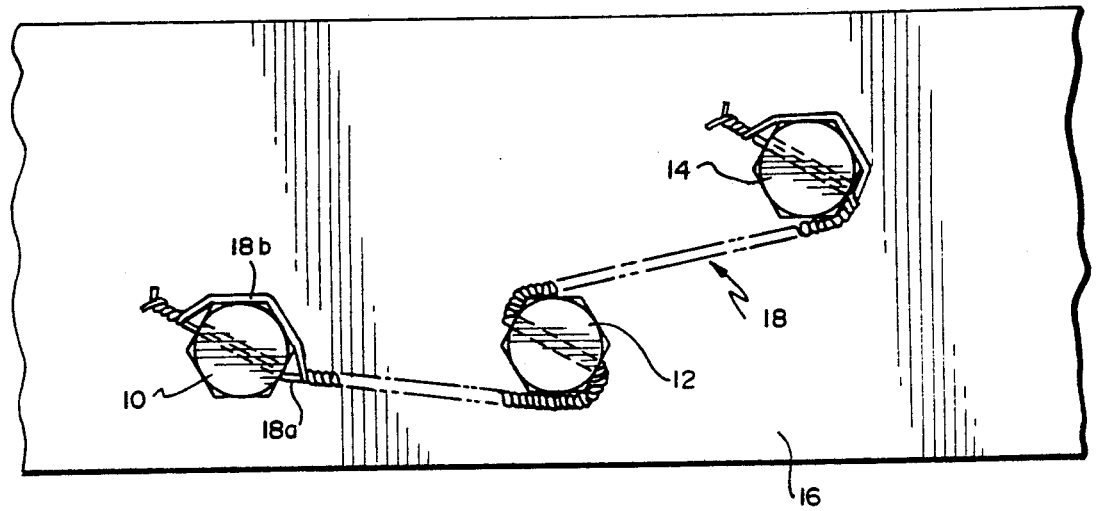
FIG_1
(PRIOR ART)
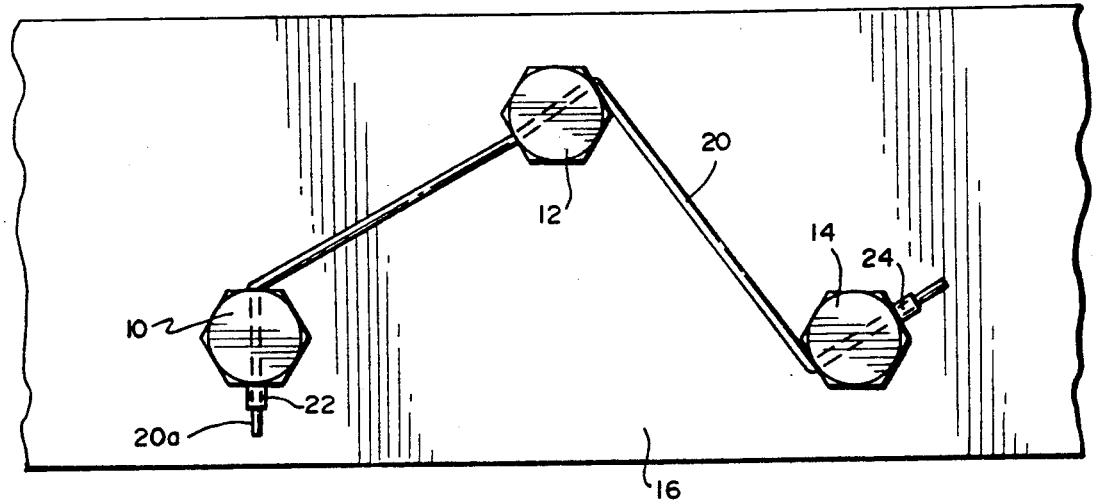
FIG_2

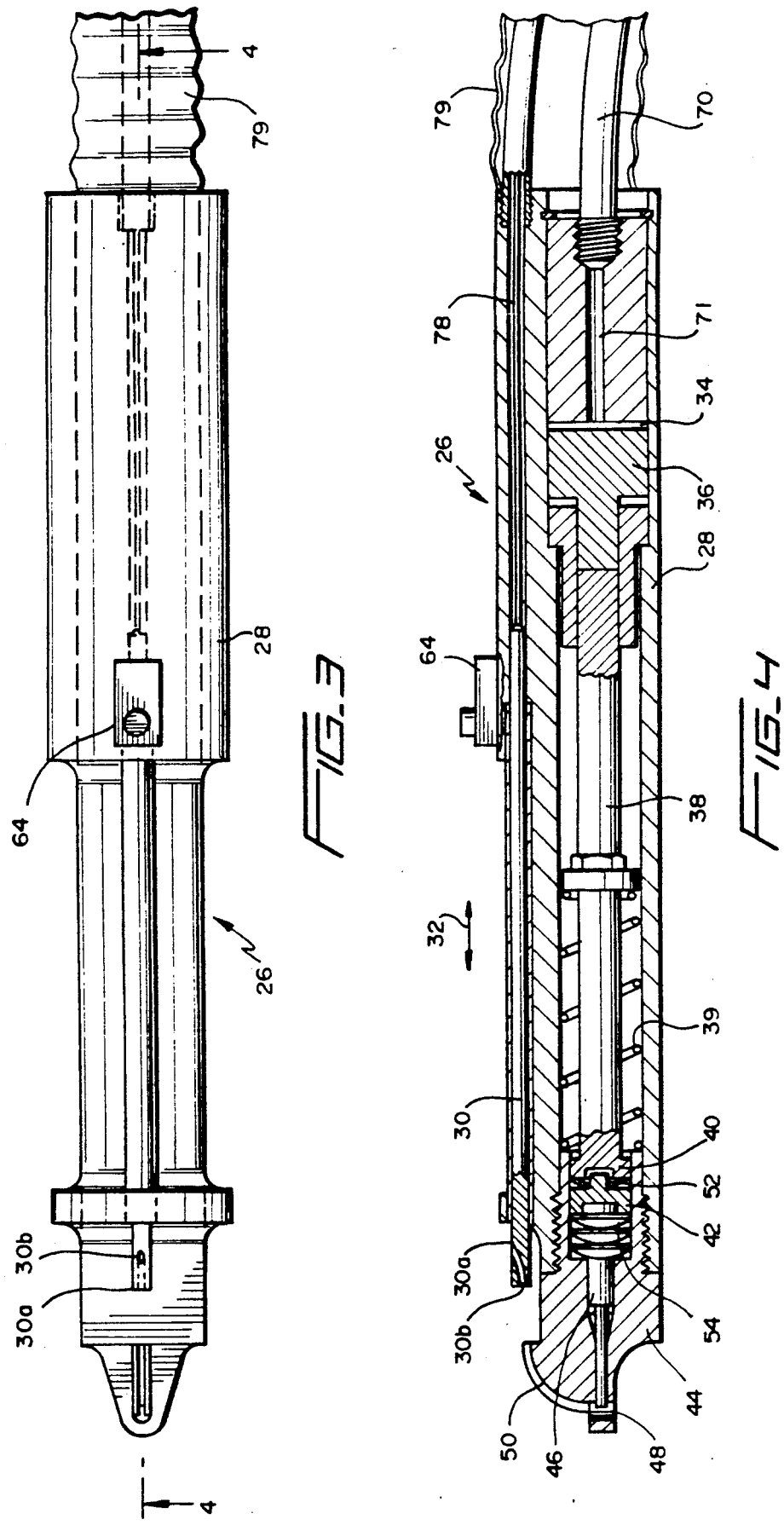

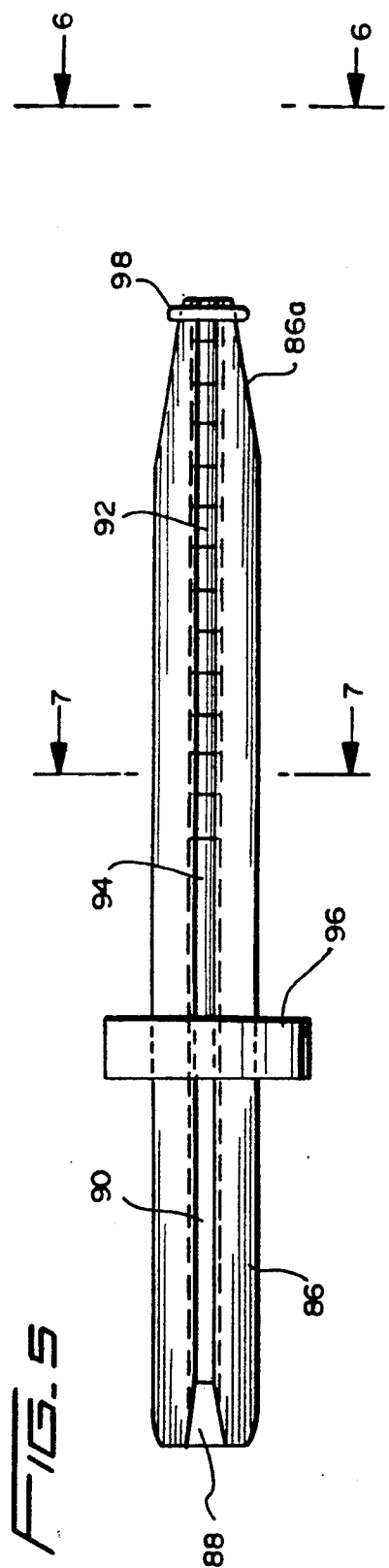
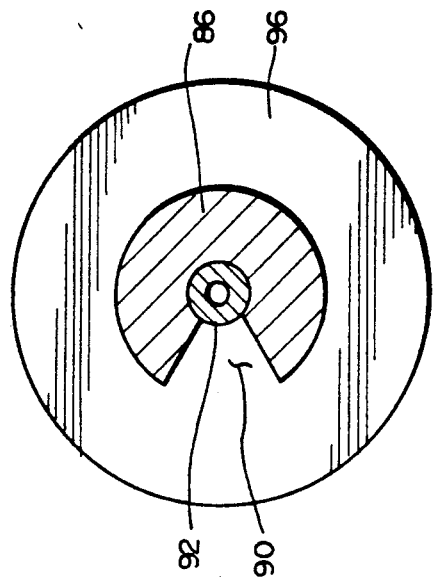
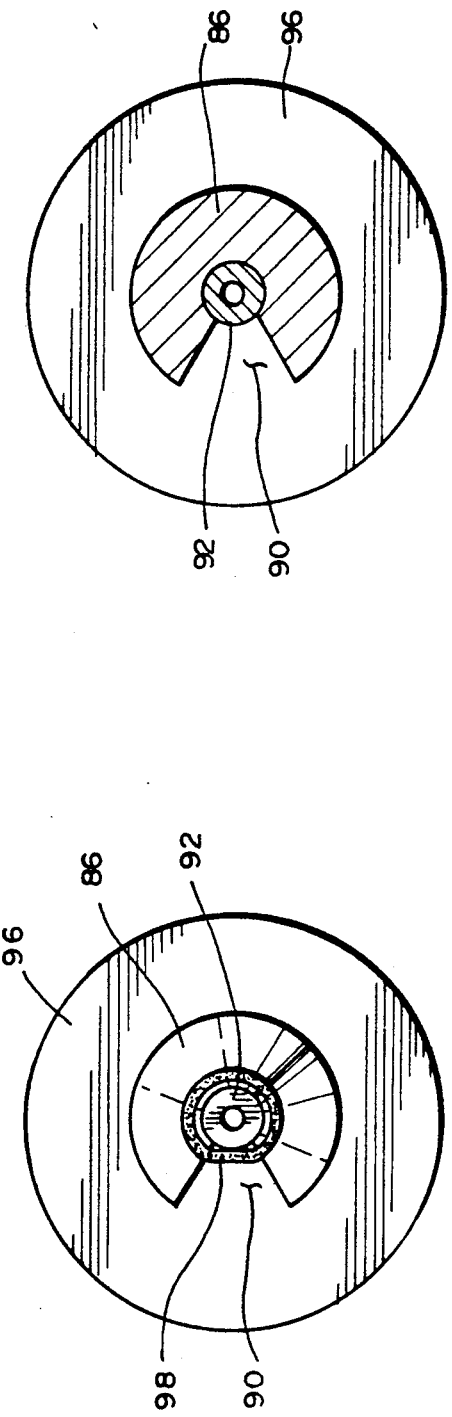

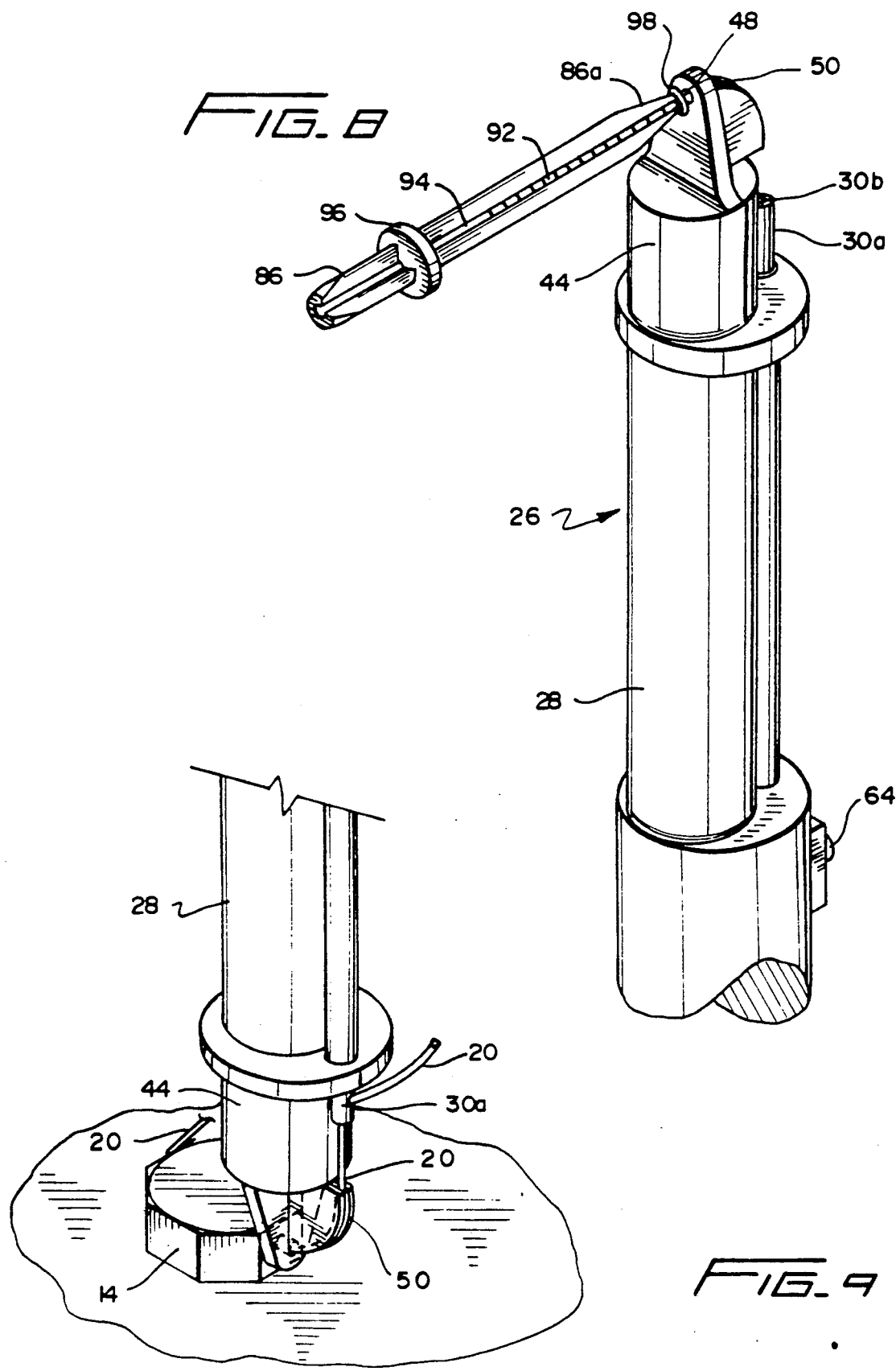

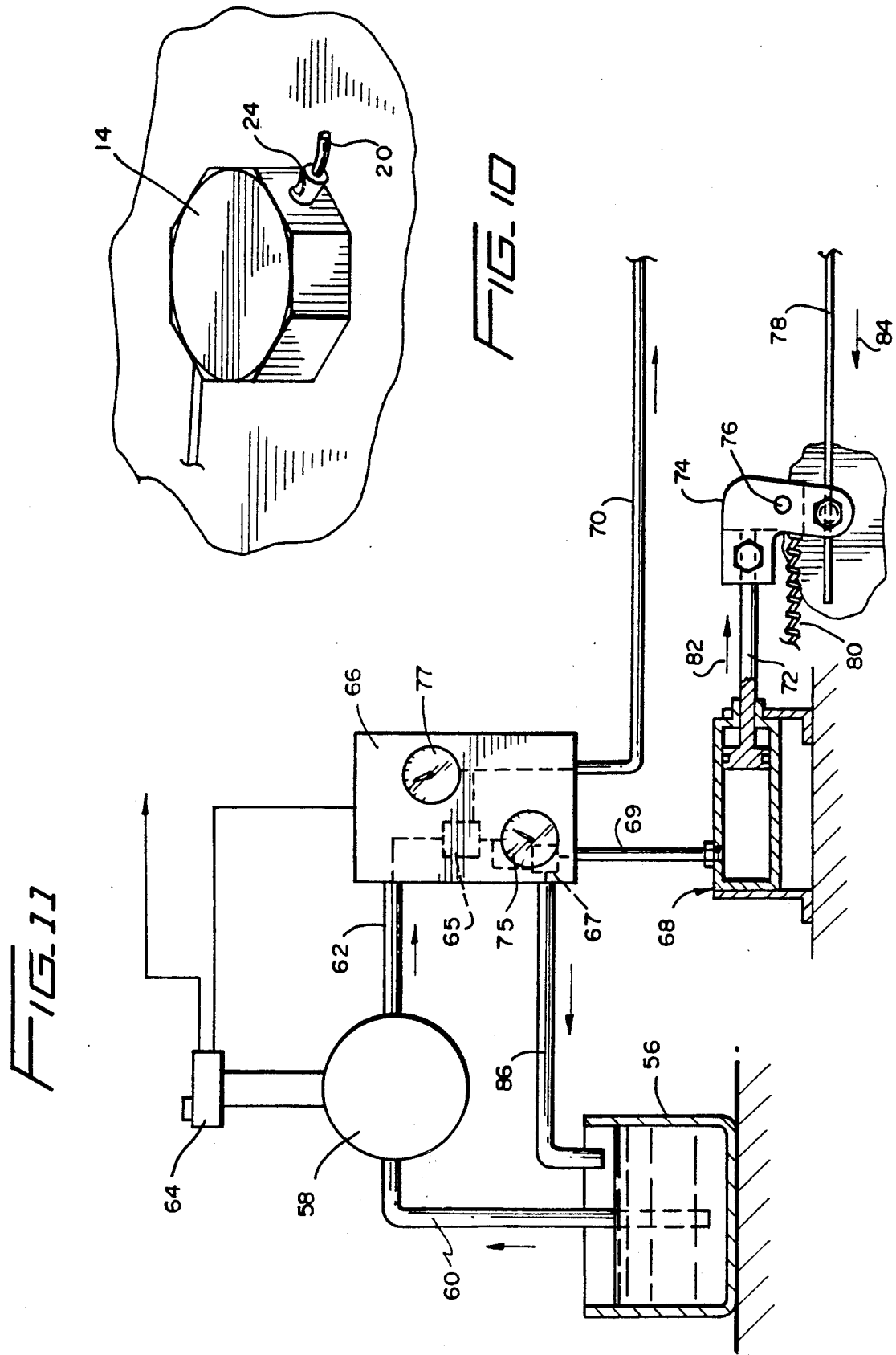

LOCK WIRE SECURING TOOL

This application is a continuation of application Ser. No. 07/422,574, filed Oct. 17, 1989 now U.S. Pat. No. 5,052,094.

BACKGROUND OF THE INVENTION

The present invention relates to a tool for applying a ferrule to a lock wire tethering together a plurality of elements such as threaded fasteners.

In rotating machinery having close tolerances between the rotating and the stationary portions, such as turbines, it is imperative that all objects, no matter how small, be kept from contacting the rotating elements of the machinery. The presence of any foreign object could result in the catastrophic failure of the entire rotating machinery.

Such machinery is inherently complex and requires the usage of many nuts, bolts, screws and other threaded fasteners to assemble all of the components of the machine. Since the operation of such machinery may involve very high rotating speeds and induce vibrations into the machine elements, it is necessary to provide some means for preventing the inadvertent unthreading of the numerous threaded tether fasteners together.

It is known to apply lock wires to threaded fasteners to prevent their inadvertent unthreading, Typically, the lock wire passes through a transverse hole in at least two threaded fasteners and is twisted back on itself in alternating clockwise and counterclockwise directions between the threaded fasteners. The process is duplicated between additional threaded fasteners until the entire threaded fastener pattern has been wired. Following the required stringing and twisting, the lock wire is cut and bent into a certain position.

While the known lock wire has provided satisfactory results, it requires a very time consuming and laborious application process. Due to the dependency upon the operators skill in twisting the lock wire, often the final result is unsatisfactory due to variations in the quantity and tautness of the twists, and the variations in the tension on the lock wire. It has been estimated that annual losses of approximately $10,000,000 are incurred just from re-working unacceptable lock wire assemblies.

SUMMARY OF THE INVENTION

The present invention relates to a device and method for applying a ferrule to a lock wire, tensioning the lock wire to a pre-determined value and crimping the ferrule onto the lock wire. The apparatus is used with a lock wire having a ferrule applied to one end and which is threaded through a plurality of threaded fasteners with a free end of the lock wire extending beyond the last of the threaded fasteners. The free end is inserted through a ferrule (held in the apppatatus) and through a tensioning rod. Movement of the tensioning rod exerts a predetermined tension on the lock wire at which time the device crimps the ferrule onto the lock wire to retain it in place at the desired tension. The free end of the lock wire extending beyond the attached ferrule is cut off to complete the process.

The invention also encompasses a magazine for storing and holding a plurality of ferrules and for inserting an individual ferrule in the apparatus. The apparatus includes a mechanism for frictionally retaining the ferrule in a position to be applied to the lock wire which prevents the inadvertent displacement of the ferrule from the device. Since the apparatus is often used in areas having restricted access, due to the complexity of the rotating machinery, retaining the ferrule in the device will enable the user to apply the ferrule to the lock wire in such restricted areas, without the danger of the ferrule dropping out of the apparatus and into the rotating machinery.

BRIEF DESCRIPTION OF THE DRAWINGS

FIG. 1 is a plan view of a known lock wire.

FIG. 2 is a plan view of a lock wire applied with the apparatus according to this invention.

FIG. 3 is a top view of the applicator according to the present invention.

FIG. 4 is a cross-sectional view taken along line 4—4 in FIG. 3.

FIG. 5 is a top view of the magazine according to the present invention for storing and inserting the ferrules.

FIG. 6 is an end view of the magazine viewed in the direction of arrow 6 in FIG. 5.

FIG. 7 is a cross-sectional view taken along 7—7 in FIG. 5.

FIG. 8 is a partial perspective view illustrating the magazine inserting a ferrule in the applicator according to the invention.

FIG. 9 is a partial, perspective view illustrating the application of the ferrule and the tensioning of the lock wire using the apparatus according to the invention.

FIG. 10 is a perspective view of the ferrule applied to the lock wire with the apparatus of the invention.

FIG. 11 is a schematic diagram of the hydraulic power supply system associated with the applicator according to the present invention.

DETAILED DESCRIPTION OF THE PREFERRED EMBODIMENT

A known lock wire is illustrated in FIG. 1 wherein separate elements such as threaded fasteners 10, 12 and 14 are engaged with portion 16 of the rotating apparatus (not otherwise shown). The lock wire 18 comprises two strands 18$a$ and 18$b$, twisted together at one end and separated such that strand 18$a$ passes through a transverse opening in fastener 10 while strand 18$b$ passes around the exterior of the fastener 10. The strands are twisted together on the opposite side of fastener 10 and pass through a transverse opening formed in fastener 12. The lock wire 18 continues until the last fastener, in this case fastener 14, whereupon one strand passes through a transverse opening in the fastener while the other strand passes around and contacts the exterior of the fastener. The strands are twisted together on the opposite side of fastener 14.

FIG. 2 illustrates a lock wire system applied using the apparatus and method according to the present invention. Threaded fasteners 10, 12 and 14 are engaged with machinery portion 16. Lock wire 20 (broadly referred to as a "flexible tension element") comprises a single strand of wire having a ferrule 22 (herein broadly referred to as a motion stopping means) fixed to end 20$a$. Lock wire 20 is threaded forwardly passed through the transverse openings formed in the threaded fasteners 10, 12 and 14 until ferrule 22 bears against fastener 10. Ferrule 22 stops further forward motion of wire 20. At this point, ferrule 24 (also a "motion stopping means") is inserted over the end of wire 20 against fastener 14, a tension is applied to the lock wire 20 and the ferrule 24 is crimped onto the lock wire such that it bears against a side of fastener 14 to prevent reverse motion of wire 20. Lock wire 20 is then cut off. The predetermined tension is maintained in lock wire 20 by the contact of ferrules 22 and 24 with threaded fasteners 10 and 14, respectively.

The applicator portion 26 of the apparatus for applying the ferrule to the second end of the lock wire is referred to as an applicator tool and is illustrated in FIGS. 3 and 4, tool 26 comprises elongated body including housing 28 having a tension rod 30 slidably mounted therein at the proximal end of the portion 26 and such that the end 30a of the tension rod extends axially outwardly of housing 28. End 30a defines a passage 30b from the distal end of the tension rod 30 to an upper surface thereof outside of the housing. Tension rod 30 is mounted in housing 28 so as to be axially movable in the directions of arrows 32 generally parallel to the longitudinal axis of housing 28 extending along line 4—4 in FIG. 3.

Housing 28 also defines a chamber 34 in which ferrule crimper actuator piston 36 is slidably retained so as to be also movable in the directions of arrows 32. Piston rod 38 extends from piston 36 and has rear anvil retainer 40 attached thereto. Spring 39 is interposed between piston rod 38 and crimp head 44 and biases the piston rod 38 toward the right as seen in FIG. 4.

Front anvil retainer 42 is arranged generally coaxially with piston rod 38 and is slidaly mounted in crimp head 44 attached to housing 28. Ferrule deforming punch 46 is connected to and extends axially from front anvil retainer 42. Crimp head 44 defines a ferrule retaining and supporting aperture or opening 48 at the distal end of portion 26 and a tension guide notch 50. Guide notch 50 is dimensioned to receive the lock wire 20 prior to the insertion of the end through passage 30b of tension rod 30.

As illustrated in FIG. 4, front anvil retainer 42 is axially spaced from rear anvil retainer 40. This spaced position is maintained by curved spring washer 52 which biases the front anvil retainer 42 toward the left. Additional curved spring washers 54 are located between the crimp head 44 and the front anvil retainer 42. The biasing forces of the respective spring washers 52 and 54 are selected such that when the gap is present between rear anvil retainer 40 and front anvil retainer 42, the forming punch 46 extends slightly into the ferrule opening 48 in a direction transverse to the axis of opening 48. When a ferrule is inserted into 46, it displaces forming punch opening 48 to the right (as seen in FIG. 4) against the biasing force of spring washer 52. This biasing force urges the front anvil retainer 42 and consequently, the distal end of forming punch 46 toward the left to exert a non-deforming (non-crimping) frictional force on the ferrule located in opening 48. The frictional force exerted by forming punch 46 retains the ferrule in opening 48 with the axis of the ferrule extending generally transverse to the longitudinal axis of body 26 until the ferrule is applied to the lock wire.

Applicator 26 is connected to a power supply indicated schematically in FIG. 11. The power supply comprises a sump reservoir 56 containing an amount of hydraulic fluid. Pump/motor 58 has inlet tube 60 extending into the sump 56 and an outlet conduit 62. The operation of the pump/motor 58 is controlled, in known fashion, by switch 64 mounted on casing 28 of the applicator 26. Outlet conduit 62 is connected to pressure cycle controller 66 which, in turn, controls the supply of pressurized hydraulic fluid to tension cylinder 68 and to hydraulic supply line 70. Hydraulic supply line 70 is connected to the proximal end of applicator 26 so as to communicate with chamber 34 via passage 71.

Tension cylinder 68 has an extendable and contractable piston rod 72 connected to bell crank 74 which is pivotally attached to a fixed structure at 76. Bell crank 74 is also connected to flexible tension rod 78, the opposite end of which is attached to tension rod 30 as seen in FIG. 4. Spring 80 biases the bell crank 74 in a counterclockwise direction around its pivot attachment point 76. Hydraulic supply line 70 and flexible tension rod 78 may be covered by a boot 79 extending from the applicator 26 to the power supply and formed of a flexible material.

Thus, as can be seen, when the pressure cycle controller 66 supplies hydraulic fluid to the tension cylinder 68 via conduit 69 causing extension of the piston rod 72 in the direction of arrow 82, bell crank 74 will pivot in a clockwise direction about pivot attachment point 76, moving the flexible tension rod 78 in the direction of arrow 84. As viewed in FIG. 4, this will move tension rod 30 toward the right relative to the casing 28 and the crimp head 44, thereby tensioning a lock wire inserted into passage 30b.

Pressure cycle controller 66 has a known pressure relief/bypass valve 67 to limit the hydraulic pressure that can be applied to tension cylinder 68. Once this predetermined pressure limit has been reached, the excess hydraulic fluid is retuned to the sump 56 via conduit 86. By limiting the hydraulic pressure supplied to the tension cylinder 68, the amount of force imparted to flexible rod 78, tension rod 30, and, consequently, to the lock wire 20 will be limited to a predetermined value. Once this value is reached, pressure activated valve 65 opens and pressurized hydraulic fluid passes through line 70 into chamber 34 via passage 71 and urges piston 36, piston rod 38 and rear anvil retainer 40 to the left as shown in FIG. 4. The movement of the rear anvil retainer 40 deforms the spring washer 52 and brings the rear anvil retainer 40 into direct contact with front anvil retainer 42. Continued movement to the left causes forming punch 46 to also move in this direction to apply a crimping force to a ferrule retained in opening 48. Gauges 75 and 77 may be provided on the power supply to provide a visual indication of the tension and crimping pressures, respectively.

The magazine for retaining and inserting the ferrules into the applicator 26 is illustrated in FIGS. 5, 6 and 7 and comprises a magazine body 86 with a tapered end portion 86a. Body 86 defines a centrally located, longitudinally extending opening 88 extending completely along its length, as well as a longitudinally extending slot 90. Slot 90 interconnects the opening 88 with the exterior surface of the body 86. As illustrated in FIG. 7, slot 90 may be tapered in a radially outwardly extending direction such that the distance between its innermost edges is less than the diameter of the opening 88.

The diameter of opening 88 is sufficient to slidably accommodate a plurality of axially aligned ferrules 92 therein. Opening 88 also slidably accommodates a feed rod 94 which bears against one end of the supply of ferrules 92 and which is connected to handle 96. An elastic friction element 98 is located around the end of body 86 and, as illustrated in FIG. 6, exerts a slight frictional force on the ferrule 92 located closest to the end of body 86. This frictional force is sufficient to retain the ferrules 92 in the body 86 as the device is manipulated by the operator. Handle 96 and feed rod 94 are both slidable with respect to the main body 86, but the interconnection has sufficient frictional force to prevent the handle 96 and the feed rod 94 from falling out of the body 86 should it be manipulated into a vertical position.

The operation of the device according to the invention is illustrated in FIGS. 8 and 9. As illustrated in FIG. 8, the magazine body 86 is placed against the crimp head 44 such that the opening 88 is in alignment with opening 48. Handle 96 and feed rod 94 are axially displaced with respect tot he body 86 to force a ferrule 92 into the opening 48. As discussed previously, the ferrule 92 is frictionally retained in the opening 48 by the force of spring washer 52 urging the forming punch 46 against the ferrule 92. This force is sufficient to retain the ferrule 92 into the opening 48, but is insufficient to cause any deformation of the ferrule.

When the ferrule has been loaded into the opening 48, the magazine is removed from the applicator 26. The applicator 26 is manipulated such that lock wire 20 is passed through the ferrule retained in the opening 48, through the notch 50 and threaded through 30b formed in tension rod 30, as shown in FOG. 9. The applicator 26 is then manipulated to a position wherein ferrule 92 bears against the side of threaded fastener 14 and the switch 64. Preferably, the housing 28 as illustrated is dimensioned so as to be manipulable by an operator. cylinder 68, which, in turn, retracts the rod 30 further into the housing 28 to exert a tension on lock wire 20. The notch 50 is curved such that the wire adjacent to the ferrule retained in the applicator is tensioned in a direction in approximately coaxial alignment with the opening in the ferrule and the opening in the threaded fastener 14. Once the predetermined tension has been applied to lock wire 20, forming punch 46 is further displaced (toward to the left as viewed in FIG. 4) to deform the ferrule and fixedly attach it to the lock wire 20. Forming punch 46 is moved via its interconnection with front anvil retainer 42 which, at this point, is in direct contact with the rear anvil retainer 40 moved by its connection with piston 36 through piston rod 38.

Once the ferrule has been sufficiently deformed, the punch 46 will be withdrawn by reducing the hydraulic fluid pressure in chamber 34 and is retracted by the force exerted thereon by spring washers 54. Spring 39 returns piston 36 and piston rod 38 to their initial positions shown in FIG. 4. The operation is completed by cutting off the lock wire 20 downstream of the ferrule 92.

The foregoing description is provided for illustrative purposes only and should not be construed as in any way limiting this invention, the scope of which is defined solely by the appended claims.

What is claimed is:

1. A ferrule applicator tool for permanently attaching a ferrule having a central axis to a tensioned flexible tension element extending through the ferrule comprising:

an elongated manipulable body portion having a longitudinal axis and including proximal and distal end areas;

ferrule retaining means at the distal end area of the body portion for retaining a ferrule in a position for receiving a flexible tension element extending through the ferrule and with the central axis of the ferrule extending in a direction generally transverse to the body longitudinal axis;

movable tension element gripping means connected to the body portion for gripping a tension element extending through a ferrule located in the ferrule gripping means;

movable tension element tensioning means connected to the body portion operatively associated with the tension element gripping means for exerting a tensioning force on a flexible tension element held by the ferrule holding means;

means for moving the tension element tensioning means in a direction so as to cause movement of the tension element gripping means generally along the longitudinal axis of the body portion toward the proximal end area thereof;

ferrule deforming means connected to the body portion for permanently deforming a ferrule located in the ferrule holding means so as to permanently secure a deformed ferrule to a tensioned flexible tension element extending through the ferrule, said ferrule deforming means movable generally parallel to the tool longitudinal axis to deform a ferrule retained in the ferrule retaining means.

* * * * *